UNITED STATES PATENT OFFICE.

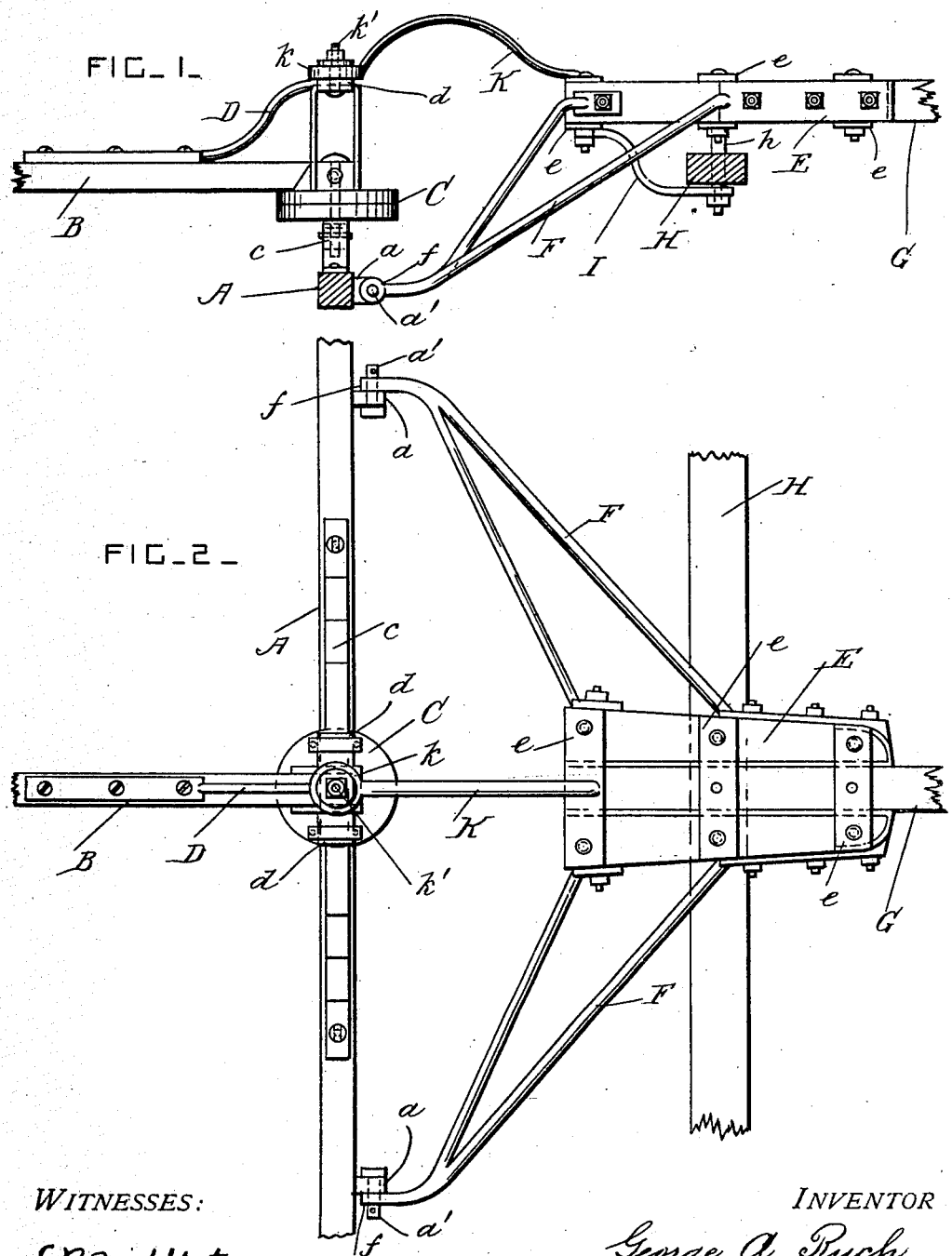

GEORGE A. RUCH, OF SYKESVILLE, MARYLAND.

DRAFT ATTACHMENT.

No. 860,330. Specification of Letters Patent. Patented July 16, 1907.

Application filed February 25, 1907. Serial No. 359,113.

*To all whom it may concern:*

Be it known that I, GEORGE A. RUCH, a citizen of the United States, residing at Sykesville, in the county of Carroll and State of Maryland, have invented certain new and useful Improvements in Draft Attachments; and I do hereby declare the following to be a full, clear, and exact description of the invention, such as will enable others skilled in the art to which it appertains to make and use the same.

This invention relates to means for attaching a draft pole to the axle of a vehicle in place of the ordinary shafts; and it consists in the novel construction and combination of the parts hereinafter fully described and claimed.

In the drawings, Figure 1 is a side view of the draft attachments. Fig. 2 is a plan view of the draft attachments.

A is the front axle of a wagon or other similar vehicle, and B is the reach which extends rearwardly of the said axle.

C is a fifth-wheel of any approved construction, and c is a spring or other suitable distance-piece interposed between the lower circle-plate of the said fifth-wheel and the said axle.

D is a curved bracket having lugs $d$ at its front end which are secured to the upper circle-plate of the said fifth-wheel in any approved manner. The rear end portion of the bracket D is secured to the said reach.

The axle A is provided with lugs $a$ to which the shafts for a single horse are attached by pivots or pivot pins $a'$ in the usual manner. When more than one horse is required, the shafts are removed, and a pole socket is substituted for them.

E is the pole socket which is formed of two longitudinal bars of wood secured together by metallic straps $e$ and fastening bolts or rivets. Forked arms F are secured to the sides of the pole socket and they are provided with eyes $f$ which engage with the pivot pins $a'$.

G is a portion of a draft pole which is inserted in the socket and secured by any approved means.

H is a doubletree which is pivoted on a pin $h$ which projects downwardly from the underside of the pole socket, and I is a bracket which connects the free end portion of the said pin with the rear part of the said pole socket.

K is a curved arm which is secured to the rear part of the pole socket and which projects rearwardly and is provided with an eye $k$ at its rear end. This eye $k$ is pivoted by a pin $k'$ to the front end portion of the curved bracket D between its laterally projecting lugs.

The curved brackets or arms D and K prevent the free end of the draft pole from moving in a vertical plane and hold it in the most desirable position.

When not required in use the pole socket is quickly detached by removing the pivot pins $a'$ and $k'$.

The metallic arms secured to the pole socket spring slightly so that the jars of the road are not transmitted through them.

What I claim is:

1. In a draft attachment, the combination, with a front axle provided with lugs for the attachment of vehicle shafts, and a reach pivotally connected with the said axle, of a pole socket, forked arms having their diverging ends secured to the said socket, said arms being downwardly and rearwardly inclined and provided at their connected ends with pins which engage with the said lugs, and brackets secured to the said reach and socket respectively and having their adjacent ends pivoted together over the said axle.

2. In a draft attachment, the combination, with a front axle provided with lugs which are spaced for the attachment of ordinary single horse shafts, and a reach pivotally connected with the said axle; of a center pole socket, forked arms having their front and diverging ends secured to the middle and rear side portions of the said pole socket, said arms being inclined rearwardly and downwardly and having their connected ends provided with pins for pivoting them to the said lugs interchangeably with the said single horse shafts, and brackets secured to the said reach and socket respectively and having their adjacent ends pivoted together.

In testimony whereof I have affixed my signature in the presence of two witnesses.

GEORGE A. RUCH.

Witnesses:
 GOWIN M. DORSEY,
 PAUL RUCH.